United States Patent [19]
Woods et al.

[11] Patent Number: 4,685,216
[45] Date of Patent: Aug. 11, 1987

[54] ARCH DOOR MARKING GAUGE

[75] Inventors: Timothy N. Woods, Rte. 3, Box 3160, Clayton, Ga. 30525; Richard D. Frye, Dillard, Ga.

[73] Assignees: Robert E. Garland, Mountain City; Timothy N. Woods, Clayton, both of Ga.

[21] Appl. No.: 881,284

[22] Filed: Jul. 2, 1986

[51] Int. Cl.⁴ .................. G01B 3/14
[52] U.S. Cl. .................. 33/176; 33/194
[58] Field of Search .................. 33/176, 177, 175, 562, 33/528, 529, 194

[56] References Cited

U.S. PATENT DOCUMENTS

| | | | |
|---|---|---|---|
| 395,875 | 1/1889 | Butler | 33/177 |
| 923,875 | 6/1909 | McDonald | 33/176 |
| 1,007,992 | 11/1911 | Van Gilder | 33/177 |
| 1,234,527 | 7/1917 | Berriman | 33/176 |
| 1,579,702 | 4/1926 | Gottschalk | 33/176 |
| 1,664,076 | 3/1928 | Humphrey | 33/194 |

*Primary Examiner*—William D. Martin, Jr.
*Attorney, Agent, or Firm*—Brisebois & Kruger

[57] ABSTRACT

A cabinet maker's arch door or crown door marking gauge has side members attachable to a work table of a table saw or shaper. A spring band is held on the side members so that opposite sides of the band are perpendicular to the sides of a panel to be marked which is positioned between the side members. The band forms a symmetrical arch between the sde members which is marked on the panel. One side of the band is adjustably held by one side member so the length of the band between the side members, and thus the height of the arch between the side members can be varied. The side member are adjustably held on the support so the distance between the side members can be changed to permit marking panels of different widths.

14 Claims, 7 Drawing Figures

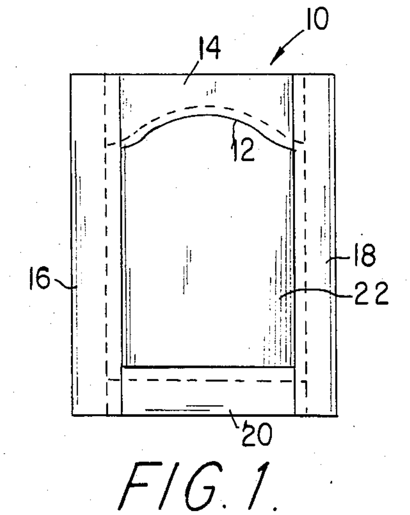
FIG. 1.
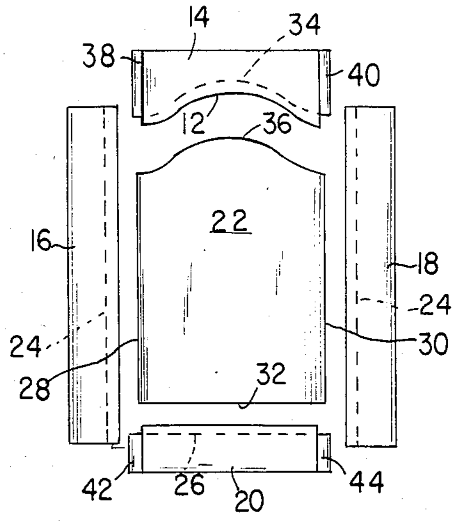
FIG. 2.
FIG. 3.
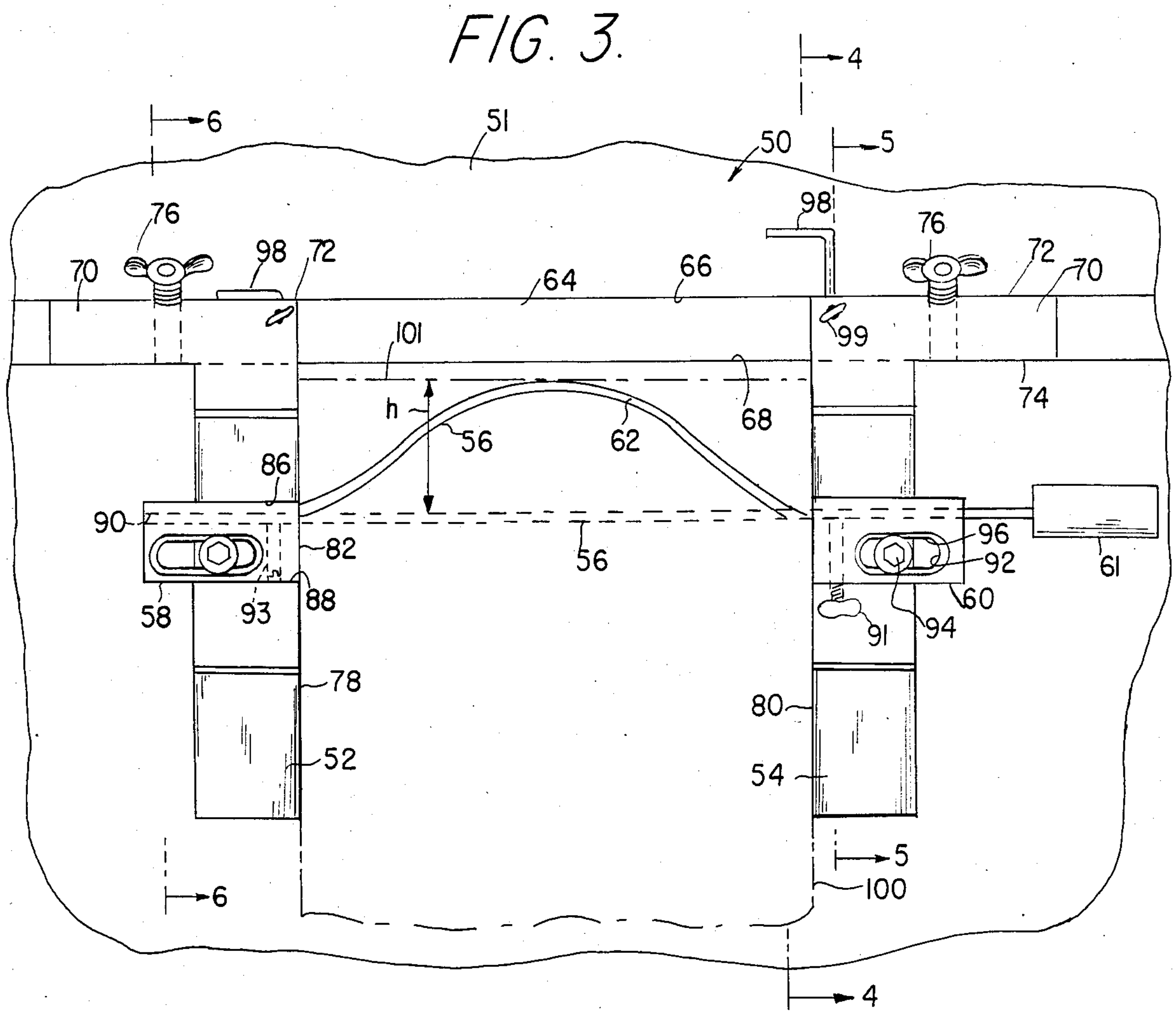

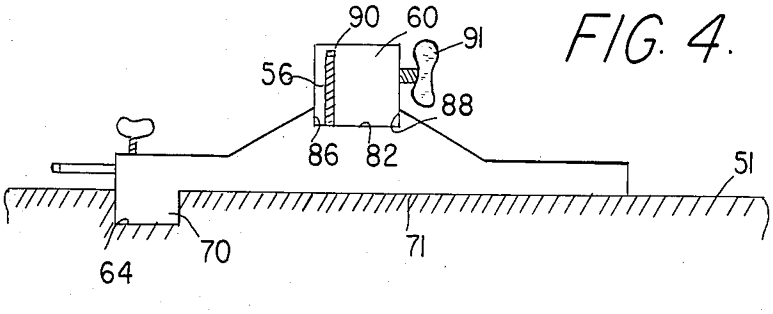
FIG. 4.
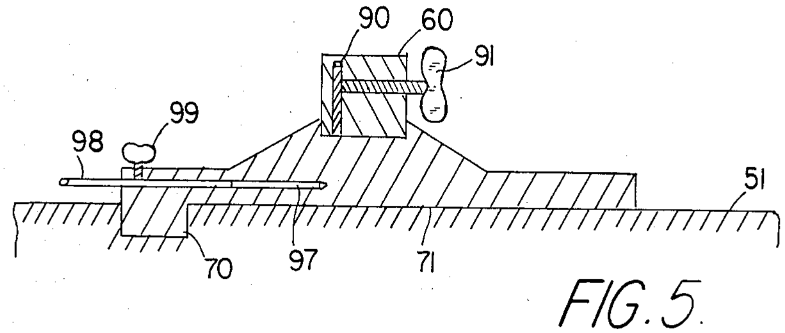
FIG. 5.
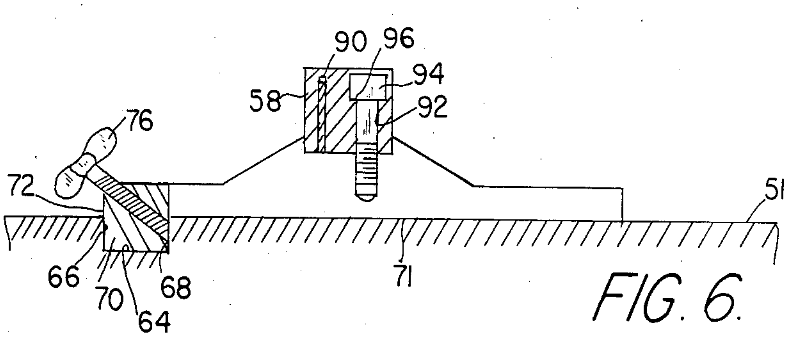
FIG. 6.
FIG. 7.
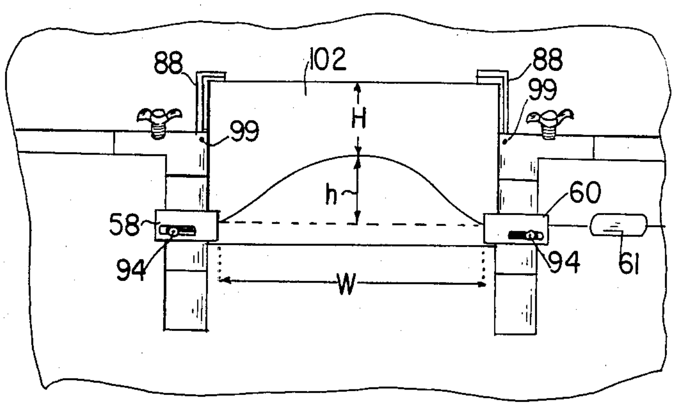

ARCH DOOR MARKING GAUGE

This invention relates generally to cabinet making tools, and particularily to a marking gauge for marking the contour of a door known as an arch or crown door.

BACKGROUND OF THE INVENTION

Arch or crown doors are decorative doors often used as cabinet doors, but which are also used as entrance doors. Such arch doors are normally of frame and panel construction, having a panel, the edges of which are received in grooves formed along the inside edges of a top rail, side rails, and a bottom rail which form the surrounding frame for the panel.

The visible portion of the arch is usually along the bottom edge of the top rail. The curve of the arch is a symmetrical compound arc curve with each lower end of the arch curving to become approximately tangent to a horizontal line perpendicular to the side edges of the rail, and the top of the arch at the center of the rail curves so it is tangent to a horizontal line spaced above the ends of the arch.

Where all the doors are of a predetermined width, or a number of doors the same width are required, as in factory made cabinets, the arch can readily be marked or cut in the top rail and the panel by using custom made templates or jigs for marking or cutting the contour of an arch of a desired height and width. A special jig or template is required for the top rail, and a different jig or template is required for the usually narrower panel.

In the past, for custom cabinets with arch doors, templates have been used for marking the rails and/or panels of the doors. Such templates may include templates for marking arches of a predetermined standard height on panels or rails of predetermined different widths. To obtain reasonable accuracy, it is necessary to have templates to mark the arches of panels for doors of one inch or so difference in width through a range of widths of the doors to be made, for example, 10 inches to 20 inches. This requires 11 templates for a width difference range of ten inches, where the arch is of a conventional or standard height.

If some standard templates are available the cabinetmaker can mark the shape of the arch on the panel, then cut the top of the panel to the shape of the arch. Since the panel is usually narrower than the rail, use of the same template to mark the rail requires very careful alignment to avoid marking a tilted or non-centered arch on the rail. Some cabinetmakers prefer to use the top edge of the panel as a template to mark the rail, (or the lower edge of the the rail to mark the panel, if the rail is cut first), but very careful aligning is again necessary since the panel is narrower than and usually somewhat thinner than the top rail. Further, with such templates the cabinet maker is restricted to a single arch height for a particular door width.

Templates for marking arches of different heights for the same door width would be quite desirable but the number of templates required would be the number of door widths times the number of different heights of arch. For example, 55 templates would be required for marking 5 different arch heights within the relatively small width difference range of ten inches. If the cabinet maker wishes to have such templates, he must make them, since there is no known source for such templates.

In much custom work, there is no standard width of cabinet, since the installation space determines the width of the cabinet, and the width of the cabinet determines the width of one or more doors of the cabinet, particularly in installations such as kitchen cabinets.

For custom cabinet work, the time required to layout and make a special template is not justifed. Where the door is of a non-standard width the cabinet maker can use either the next larger or smaller template, which is not quite accurate, and as a result the appearance of the finished cabinet is not wholly satisfactory.

Correspondingly, a disadvantage of templates is that a particular template is accurate only for its particular door width and arch height. Where the cabinet maker has such templates available, and needs to mark the arch of a panel for an odd size door, the marking is usually not accurate. Even where the marking is quite accurate, the required dimensions are compromised and the final product is not what was originally designed. Further, the problems involved in marking both the panel and the rail still exist, since a template for marking a rail is not satisfactory for marking the usually narrower panel and vice-versa.

In essence, when using templates for arch marking in custom cabinet work, an exact predetermined arch height is frequently not obtainable, for doors of many non-standard widths. Since a principle reason for custom cabinet work is to fit the cabinet to the available installation space, templates are simply not satisfactory.

SUMMARY OF THE INVENTION

In accordance with the invention, apparatus is provided for acurately marking a panel or rail of an arch door of any desired width and arch height. This is accomplished in accordance with the invention by providing an infinitely adjustable gauge for marking the arch or crown contour of panel doors regardless of the width of the doors or the arch height.

In accordance with the invention such a gauge is provided which enables accurate marking of a true arch of virtually any height for virtually any panel or door width. A preferred embodiment of the invention provides for marking panels from about six inches to about thirty six inches in width, but larger or smaller panels can also be marked with slight modifications to the apparatus.

In accordance with the invention the gauge has a flexible band which can be resilient and preferably takes the form of a spring steel strip. The band extends between and is held by two side members which are connected to a common support so that the distance between them can be adjusted to straddle door panels or rails of virtually any width. The band has a first end which is secured to a first side member with a length of the band at a predetermined angle, preferably perpendicular, to the adjacent side edge of the rail or panel between the side members. At the second side member a length of the band is also held at the same angle, preferably perpendicular, to the there adjacent side edge of the rail or panel between the side members.

The band is releasably held at one side member so that the length of the band between the side members can be varied. By virtue of the flexibility of the band, the band as it is fed inwardly assumes the true curvature of an arch which is symmetrical about the centerline of the rail or panel between the side members. The height of the arch can be precisely set by varying the length of band between the side members.

In the preferred embodiment, the side members are constructed to be secured in the groove of a work table such as the table of a table saw, so there is a flat and true surface for supporting the rail or panel to be marked. The band is spaced above the table by a distance essentially equal to the thickness of the usual rail stock, so the bottom edge of the band is adjacent to the top surface of the rail. The arch shape of the band can then be marked on the rail by tracing along a side of the band, with a marking instrument such as a pencil or scriber. Where the panel is considerably thinner than the rail, spacers can be used between the underside of the panel and the worktable to elevate the panel to an elevation adjacent to the bottom edge of the band.

In one preferred embodiment, the band is held at the side members in blocks which are laterally adjustable on the side members to permit marking on the wider top rail the same arch contour as is marked on the narrower panel.

In another embodiment, the band is held at the side members in fixed blocks and spacers are used between the sides of the panel and the side members to accurately align the panel and thus permit marking on the narrower panel, the same arch countour as is marked on the wider top rail.

Adjustable stops are also provided on the side members for accurately positioning the top edge of the panel or rail where several identical panels and/or rails are required.

Other features and advantages of the invention will become apparent from the drawings and the description which follows.

BRIEF DESCRIPTION OF DRAWINGS

FIG. 1 is a top plan view of a conventional arch or crown door of conventional frame and panel construction;

FIG. 2 is a view corresponding to FIG. 1, but with the panel, and the frame elements of the door separated;

FIG. 3 is a top plan view showing an apparatus according to the invention for marking the arch or crown contour on a panel or rail;

FIG. 4 is a side view in section taken along line 4—4 of FIG. 3;

FIG. 5 is a side view in section taken along line 5—5 of FIG. 3;

FIG. 6 is a side view in section taken along line 6—6 of FIG. 3; and FIG. 7 is a top plan view showing the manner in which the apparatus of FIG. 3 is adjusted to mark a panel having a width different from the width of top rail of a door.

DETAILED DESCRIPTION

FIGS. 1 and 2 show a cabinet door 10 of conventional construction with an arch or crown 12 which can be precisely formed, in accordance with the invention. The door 10 has a top rail 14, side rails 16, 18, and a bottom rail 20, which form a frame around a panel 22, which is within the rails. The side rails 16, 18, each have a straight groove 24 formed in an inner edge, and bottom rail 20 has a straight groove 26 in its upper edge, to receive the respective straight side edges 28, 30, and bottom edge 32, of panel 22.

The curved crown or arch 12 extends along the bottom edge of top rail 14, and a curved groove 34 of uniform depth is formed in this bottom edge to receive the arch curved top edge 36 of the panel. In the exemplery construction shown at FIGS. 1 and 2, the grooves are each formed mid-way of the thickness of the rails and the panel is of uniform thickness.

Top rail 14 has tongues 38, 40, at its ends, and bottom rail 20 has tongues 42, 44, at its ends which extend into and are glued in the grooves 24 of side rails 16, 18, to hold the rails together around the panel.

To make door 10, side rails 16, 18, and bottom rail 20 are cut to the required length. Top rail 14 is cut to the same length as bottom rail 20, but at this stage is rectangular. The tongues are then formed at the ends of the top and bottom rails, for example, with a shaper.

The panel 22 is initially in the form of a rectangular blank of the required height and width, the height being slightly greater than the distance between the top of the crown and the lower edge of the panel, to provide space for marking and cutting the arch. After the arch is marked on the panel, the top of the panel is cut to the curve of the arch, usually with a band-saw. The top rail 14 is then marked and the arch curve is cut to form its bottom edge. Using the bottom edge as a guide the groove 34 is cut in the top rail with a shaper, and the grooves are cut in the side and bottom rails using the same shaper set up.

In the past, for custom cabinet work, the arch of the panel was marked with a usually inexact template, which required compromising the desired arch height or form, and after cutting the arch, the panel was then used as a template or gauge to mark the arch curve on the top rail (or the top rail was marked and cut, and used as a template to mark the panel.

It is considered to be good (and necessary) practice to provide a clearance between the bottoms of the grooves of the several rails, and side, and top and bottom edges of the panel, so that when the rails are assembled around the panel as shown at FIG. 1, the panel floats in the grooves and can expand and contract without breaking the tongue and groove joints between the horizontal top and bottom rails and the side rails. However, the tongues on the top and bottom rails must be about the same length as the depth of the grooves in the side rails, or gaps show at the top and bottom edges of the door. Thus, the width of the top rail between the ends of its tongues in this frame construction is greater than the width of the panel. This difference in width, as well as the difference in thickness of the top rail and panel make it quite difficult to accurately mark the arch curve on the top rail from the panel, or to mark the arch curve on the panel from the top rail. Incorrect markings, and the resulting incorrect cutting can result in non-symmetry, a tilted and unsightly arch, gaps between the top of the panel and the top rail, or insufficient clearance and binding of the panel in the grooves of the rails, with resultant cracking of the tongue and groove joints.

These problems are all avoided by using the arch marking gauge of the invention. As shown at FIG. 3, arch marking gauge 50 of the invention is mounted on a work table 51, and includes a first side member 52, a second side member 54, and a flexible band 56 which extends between the side members and is held in blocks 58, 60 mounted on the respective side members. A hand grip 61 in the form of a sponge rubber sleeve is provided on the band 56 to facilitate feeding the band through the block 60 to form a symmetrical arch curve 62 of a desired height between the side members. A band 56 of spring steel about 1/16" thick, and about ¾" wide works quite well and automatically forms the symmetrical arch curve 62 between the side members, by feeding the band inwardly through block 60, after initially guiding the center portion of the band slightly upwardly.

The side members are adapted to be secured in a standard table slot 64 having parallel sides 66 and 68, of a work table 51 such as that of a table saw, or other tool having a work table with a similar slot. For this purpose each side member has, adjacent its upper end, a rectangular bar 70, the lower portion of which projects downwardly beneath bottom surface 71 of the side member as shown at FIGS. 4 to 6, and which is preferably of a length greater than the width of the side member and extends outwardly of the side member as shown at FIG. 3. Bar 70 is of a width, between its parallel side faces 72 and 74, to enter and slide in table slot 64.

Each bar 70 has a threaded opening about mid-way between its ends which extends downwardly at an acute angle and opens through the side face 74 of the bar so that a wingscrew 76 threaded into the opening and advanced, engages side 68 of slot 64, to force side face 72 of the bar tightly against the opposite side 66 of the slot. In this manner the the bar and its side member are locked in the table slot.

Side member 52 has a straight inner edge 78 which is perpendicular to side face 72 of its bar 70, and side member 54 has a straight inner edge 80 which is perpendicular to side face 72 of its bar 70. Therefore, when the wingscrews 76 are tightened, the inner edges 78 and 80 are parallel to each other.

In the embodiment show, each side member is of metal, such as cast aluminum, with the bar 70 as an integral portion. However, the bar 70 can be a separate piece secured to the side member with screws.

The central portion of each side member is of greater thickness than the ends of the side member to provide a pedestal with sloping sides. A "U" shaped seat 82, (FIG. 4) is machined in the pedestal of each side member. Each seat has parallel edges 86 and 88, which are parallel to side face 72 of bar 70, and perpendicular to the inner edges 78 and 80 of the respective side members.

Blocks 58 and 60 are mirror images of each other. The blocks are of a width to be a close sliding fit in the respective seats between the side edges 86 and 88 of the seats.

Each block has a straight downwardly opening slot 90 (FIG. 4) of a height and width slightly greater than the height and thickness of the band 56, to slidably receive a length of the band 56. A threaded bore extends from one side of the block through one side face of the slot 90. A wingscrew 91 is threaded into block 60 to releasably secure the length of band which extends through this block. A set screw 93 secures a length of the left hand end of the band 56 in the slot of block 58.

Each block 58, 60 has an elongated opening 92 to receive the shank of an allen head screw 94 which extends downwardly through the block and is threaded into a correspondingly threaded opening in the bottom of the seat 82, as shown at FIG. 6. The opening 92 has an enlarged upper portion which provides a recessed shoulder 96 which is engaged by the underside of the head of screw 94, when the screw is tightened, to secure the block to the side member. The distance from the shoulder to the top of the block is slightly greater than the height of the screw head so the head is recessed when the screw is tightened.

A long small diameter hole 97 is drilled in each side member through face 72, slightly outwardly of the inner edge of the side member. As shown at FIG. 5, an L shaped height gauge stop 98 of stiff wire extends into this opening and a thumb screw 99 threaded in the side member intersects hole 97 so the stop can be adjusted and clamped at a desired position. In FIG. 3, the stop 98 in the side member 52 is shown retracted, and the stop 98 in the side member 54 is shown partly extended.

MARKING WITH THE GAUGE

The gauge 50 of the invention can be used in the following manner to mark an arch curve 62 of a height "h", (which can be any desired height) on a panel 100 shown in phantom lines at FIG. 3.

Initially, the side members are placed on the work table 51 with the bars 70 in the table slot 64. The band 56 is pushed through slot 90 of block 60 from left to right, until it extends between the side members, and a length of the left hand end is inserted in the slot 90 of block 58 and set screw 93 is tightened. The side members are then spaced apart a distance slightly greater than the width of the panel 100. The band then extends straight between the side members 52 and 54, and the bottom edge of the band is spaced about $\frac{3}{4}''$ above the surface of table 51 by the pedestal portions of the side members.

The panel is placed between the side members, beneath the band 56, and the side members are moved together until the inner edges 78 and 80 just touch the sides of the panel. The top edge 101 of the panel 100 is moved to the position shown in which this edge is at the distance h above the straight band. The side members are then pushed toward each other to clamp the panel between the inner edges 78 and 80, and the wing screws 76 are tightened.

Where the panel is quite thin, for example $\frac{1}{4}''$, a spacer panel can be placed between the panel and the work table 51 to raise the panel so its top surface is adjacent the bottom edge of the band 56.

With the panel firmly held and accurately positioned between the side members, and wing screw 91 loosened, hand grip 61 is grasped, and the band is fed to the left through block 60 until an arch is formed by band which is close to the desired height h, and wingscrew 91 is temporarily tightened. For final adjustment it may be necessary to change the position of the handgrip sleeve 61 on the band, which is easily done by sliding the sleeve along the band without gripping the sleeve. With the handgrip 61 positioned on the band about an inch or two from the block 60, wing screw 91 is loosened, the band is fed inwardly through the block 60 until the top of the arch 62 is just below the top edge of the panel, which corresponds to the height h, and the wing screw is tightened to lock the band in this position. The band can then be pushed downwardly to touch the panel and the arch contour of the band is marked on the panel with a pencil or scriber using the convex side of the band as a guide.

After the panel is marked and removed from the gauge, the wider top rail is marked. Wing screw 91 is loosened and the band 56 is returned to its straight position between the blocks. The allen head screws 94 are then loosened, blocks 58 and 60 are each moved inwardly a distance equal to $\frac{1}{2}$ the difference in width between the top rail and the panel, to the positions shown at FIG. 7, and the screws 94 are tightened. With the top rail 102 between and engaged by the side members, the distance between the blocks should be distance W (FIG. 7), which is the width of the panel. The band is then fed through block 60 until the arch 62 has the same height h as the arch of the panel. The top rail 102 is then positioned so that it has the required rail height H above the top of arch 62 of the band. Top rail 102 is then marked using the convex surface of the band as a guide.

If several identical rails are to be marked, the stops 98 are adjusted to engage the top edge of the rail as shown at FIG. 7, when the first rail is properly positioned for marking, and the stops are locked by tightening the thumbscrews 99. The top edge of additional rails to be marked is placed against the so adjusted stops, which preset the rail height H.

With the arch contour accurately marked on both the panel and the top rail, the cutting can be done accurately and a perfect contour and fit are assured.

In a variation of the embodiment shown, the blocks 58 and 60 are secured to the side members in the positions shown at FIG. 3, with screws, but the blocks are not laterally adjustable. In this variation, the wider top rail is marked first. Then, the panel is placed between the side members and spacer strips each of a width equal to one half the difference in width between the panel and the top rail are positioned on opposite sides of the panel. The panel is then marked while the side members are the same distance apart as the width of the top rail. Since the panel is centered between the side members by the spacers, an arch of the same contour as marked on the rail can be accurately marked on the panel.

While the invention is particularly usefull for marking arch curves for cabinet doors it can be used for marking exterior doors, or for other woodworking marking that requires a full or partial arch.

It is to be appreciated that the gauge of the invention can be used to mark arch curves on doors of various contructions. For example, dowels could be used instead of the tongues at the ends of the rails to secure the rails to the side members. With such construction the panel is wider than the top rail, but both can easily be marked with the gauge of the invention.

While prefered embodiments have been described changes can of course be made without departing from the scope of the invention.

We claim:

1. A cabinet maker's arch door marking tool comprising a first side member adapted to be mounted on a support, a second side member adapted to be mounted on the support in spaced relation to the first side member, means on said first and second side members for locating a panel to be marked in a predetermined position relative to the side members, means for securing said side members to the support in different spaced apart positions relative to each other, to accomodate, between said side members, a panel to be marked of a desired width, a flexible band extending from said first side member to said second side member, means on said first side member for holding a first length of said flexible band substantially perpendicular to a first side edge of the panel to be marked, means on said second side member for holding a second length of said flexible band in alignment with said first length and substantially perpendicular to a second side edge of the panel to be marked, and means for securing said band at different selected locations along its length with respect to at least one of said side members so that the length of the band between the side members can be varied to form symmetrical compound arches of different selected heights between said side members, said flexible band comprising means for marking the contour of the arch formed by the band on the panel positioned between the side members.

2. A cabinet maker's tool according to claim 1, further comprising feed means to facilitate feeding said band through one of said holding means to vary the height of the arch of the band between said side members.

3. A cabinet maker's tool according to claim 2 wherein said feed means for feeding the band comprises, a hand grip on said band for manually pushing the band through the holding means.

4. A cabinet maker's tool according to claim 1, wherein said means for securing said side members to a support in different spaced apart positions relative to each other comprises, means on said side members for engaging a straight edge of the support, means for securing one of said side members to the support, and means for securing the other of said side members to the support at different locations on the support.

5. A cabinet maker's tool according to claim 1, wherein the support to which the side members are adapted to be secured is a work table having an elongated slot, said means for securing the side members to a support in different spaced apart positions relative to each other comprises, a first downwardly extending rectangular projection on said first side member, a second downwardly extending rectangular projection on said second side member, and means for securing said rectangular projections in the elongated slot of the work table.

6. A cabinet maker's tool according to claim 1 further comprising, adjustable stop means on at least one of said side members for engaging a top edge of the panel to be marked, to facilitate positioning the panel with its top edge at a predetermined distance from the aligned lengths of the flexible band.

7. A cabinet maker's tool according to claim 1, wherein said flexible band comprises a band of spring metal of essentially constant height and thickness.

8. A cabinet maker's tool according to claim 1, wherein, said means on said first side member for holding a first length of said flexible band substantially perpendicular to a first side edge of the panel to be marked comprises, a first block on said first side member, said first block having an elongated guide for holding said first length of said band, and said means on said second side member for holding a second length of said flexible band in alignment with said first length and substantially perpendicular to a second side edge of the panel to be marked comprises, a second block on said second side member, said second block having an elongated guide for holding said second length of said band in alignment with said first length of said band.

9. A cabinet maker's tool according to claim 8, wherein said elongated guide of said first block comprises a slot extending at least partially through said first block, and said elongated guide of said second block comprises a slot extending at least partially through said second block.

10. A cabinet maker's tool according to claim 1, wherein, said first side member comprises an elongated member having a straight inner edge, said second side member comprises an elongated member having a straight inner edge, said straight inner edges comprising said means on said first and second side members for locating a panel to be marked in a predetermined position relative to the side members.

11. A cabinet maker's arch door marking tool comprising a first elongated side member adapted to be mounted on a support, a second elongated side member adapted to be mounted on the support in spaced parallel relation to the first side member, means for securing said side members to the support in different spaced apart positions relative to each other, to accomodate, between said side members, a panel to be marked of a desired width, a flexible band extending from said first side member to said second side member, a first block on said side member, said first block have an elongated slot therein for holding a first length of said flexible band substantially perpendicular to a first side edge of the panel to be marked, a second block on said second side member, said second block have a slot therein for holding a second length of said flexible band in alignment with said first length and substantially perpendicular to a second side edge of the panel to be marked, means for securing said band at different selected locations along its length to at least one of said blocks so that the length of the band between the side members can be varied to form symmetrical compound arches of different selected heights between said side members, said flexible band comprising means for marking the contour of the arch formed by the band on the panel positioned between the side members.

12. A cabinet maker's tool according to claim 11, wherein said means for securing said band at different selected locations along its length to at least one of said blocks comprises, a screw threaded into said second block for clamping the band in the slot.

13. A cabinet maker's tool according to claim 12, wherein said screw comprises a thumb screw.

14. A cabinet maker's tool according to claim 11, further comprising means mounting said first block on said first side member for adjustment to different lateral positions on said first side member, means mounting said second block on said second side member for adjustment to different lateral positions on said second side member, and means for securing said blocks to said side members in the different lateral positions.

* * * * *